US012760529B2

(12) United States Patent
Lakrout et al.

(10) Patent No.: US 12,760,529 B2
(45) Date of Patent: Oct. 13, 2026

(54) PANELS AND METHODS OF PREPARATION THEREOF

(71) Applicant: WESTLAKE ROYAL BUILDING PRODUCTS INC., Houston, TX (US)

(72) Inventors: Hamed Lakrout, San Antonio, TX (US); Soufiane Mohand-Kaci, San Antonio, TX (US); Russell L. Hill, San Antonio, TX (US); Wayne Buoni, Johns Creek, GA (US); Russ Kendal Majors, San Marcos, TX (US); Brian Allen Shaw, Elmendorf, TX (US)

(73) Assignee: WESTLAKE ROYAL BUILDING PRODUCTS INC., Houston, TX (US)

( * ) Notice: Subject to any disclaimer, the term of this patent is extended or adjusted under 35 U.S.C. 154(b) by 368 days.

(21) Appl. No.: 18/006,758

(22) PCT Filed: May 28, 2021

(86) PCT No.: PCT/US2021/034923
§ 371 (c)(1),
(2) Date: Jan. 25, 2023

(87) PCT Pub. No.: WO2022/026050
PCT Pub. Date: Feb. 3, 2022

(65) Prior Publication Data
US 2023/0272621 A1 Aug. 31, 2023

Related U.S. Application Data

(60) Provisional application No. 63/057,024, filed on Jul. 27, 2020.

(51) Int. Cl.
*E04F 13/08* (2006.01)
*B32B 3/06* (2006.01)
(Continued)

(52) U.S. Cl.
CPC ............ *E04F 13/0875* (2013.01); *B32B 3/06* (2013.01); *B32B 3/30* (2013.01); *B32B 5/16* (2013.01);
(Continued)

(58) Field of Classification Search
CPC . E04F 13/0875; E04F 13/147; E04F 13/0832; E04F 13/141; E04F 13/185;
(Continued)

(56) References Cited

U.S. PATENT DOCUMENTS 4,010,232 A * 3/1977 Labrecque ............ B32B 13/045 428/312.4
4,559,263 A * 12/1985 Roodvoets .............. B32B 13/12 428/312.4
(Continued)

FOREIGN PATENT DOCUMENTS

CA 2529549 C 5/2011
EP 3249135 A1 11/2017
(Continued)

OTHER PUBLICATIONS

International Search Report for PCT/US2021/034923 dated Sep. 17, 2021 (3 pages).
(Continued)

*Primary Examiner* — Patrick J Maestri
(74) *Attorney, Agent, or Firm* — Bookoff McAndrews, PLLC

(57) ABSTRACT

Composite panels and methods of use and manufacturing are described herein. The composite panels may comprise a foam composite and one or more layers of a facing material. The foam composite may have a density less than or equal to 20 pcf, and the layer(s) of facing material, e.g., inorganic facing material, may have a thickness of 1/16 inch to 1 inch covering at least the front surface of the foam composite.

16 Claims, 1 Drawing Sheet

(51) Int. Cl.

| | |
|---|---|
| ***B32B 3/30*** | (2006.01) |
| ***B32B 5/16*** | (2006.01) |
| ***B32B 13/04*** | (2006.01) |
| ***B32B 37/14*** | (2006.01) |
| ***E04F 13/14*** | (2006.01) |

(52) U.S. Cl.
CPC ............ *B32B 13/045* (2013.01); *B32B 37/14* (2013.01); *E04F 13/147* (2013.01); *B32B 2264/101* (2013.01); *B32B 2264/104* (2013.01); *B32B 2264/2032* (2020.08); *B32B 2266/0228* (2013.01); *B32B 2266/0235* (2013.01); *B32B 2266/025* (2013.01); *B32B 2266/0257* (2013.01); *B32B 2266/0264* (2013.01); *B32B 2266/0278* (2013.01); *B32B 2307/4026* (2013.01); *B32B 2307/72* (2013.01); *B32B 2307/7376* (2023.05); *B32B 2315/06* (2013.01); *B32B 2451/00* (2013.01); *B32B 2607/00* (2013.01); *E04F 13/0832* (2013.01)

(58) Field of Classification Search
CPC ..... B32B 3/06; B32B 13/045; B32B 2451/00; B32B 2607/00
See application file for complete search history.

(56) References Cited

U.S. PATENT DOCUMENTS

| | | | | |
|---|---|---|---|---|
| 5,502,940 | A * | 4/1996 | Fifield | E04D 1/28 52/591.4 |
| 5,930,964 | A | 8/1999 | Boehning | |
| 6,355,193 | B1 | 3/2002 | Stott | |
| 6,362,302 | B1 | 3/2002 | Boddie | |
| 6,726,864 | B2 | 4/2004 | Nasr et al. | |
| 6,790,544 | B2 | 9/2004 | Schmitz | |
| 7,306,757 | B2 | 12/2007 | Harrington | |
| 7,396,495 | B2 | 7/2008 | Friesner | |
| 7,718,253 | B2 | 5/2010 | Griffin et al. | |
| D622,419 | S | 8/2010 | King | |
| D622,420 | S | 8/2010 | King | |
| 7,790,784 | B2 | 9/2010 | Nasr et al. | |
| 7,997,039 | B2 | 8/2011 | Wolf et al. | |
| 8,042,309 | B2 | 10/2011 | Wolf et al. | |
| 8,136,323 | B2 | 3/2012 | King | |
| 8,782,988 | B2 | 7/2014 | Wolf et al. | |
| 9,091,086 | B2 | 7/2015 | Michalski et al. | |
| 9,580,906 | B1 | 2/2017 | Spencer | |
| 9,695,596 | B2 | 7/2017 | McIntosh et al. | |
| 9,850,668 | B2 | 12/2017 | Pepa | |
| 9,963,885 | B2 | 5/2018 | Taylor, Jr. et al. | |
| 9,982,440 | B2 | 5/2018 | Cole et al. | |
| 2002/0106504 | A1 | 8/2002 | Stott | |
| 2005/0055931 | A1 | 3/2005 | Rochette | |
| 2008/0155922 | A1 | 7/2008 | Wolf et al. | |
| 2010/0251648 | A1 | 10/2010 | Wilson et al. | |
| 2019/0301178 | A1 | 10/2019 | Steffes et al. | |
| 2020/0377425 | A1* | 12/2020 | Kumar | C04B 14/24 |

FOREIGN PATENT DOCUMENTS

| | | | |
|---|---|---|---|
| KR | 10-1996-0029543 | A | 8/1996 |
| KR | 10-2016-0056528 | A | 5/2016 |
| WO | 2017/074425 | A1 | 5/2017 |

OTHER PUBLICATIONS

Barron Designs, "Faux Panels," available at https://www.barrondesigns.com/faux-panels/, last accessed Dec. 22, 2022 (5 pages).
Barron Designs, "Faux Stone Panels," Jan. 5, 2016, available at https://www.youtube.com/watch?v=f5hGoOrGGqk. (7 pages).
"Panels4Less, Buy Faux Stone," available at https://panels4less.com/, last accessed Dec. 22, 2022 (10 pages).
"Urestone Panels: Home Renovation," available at https://www.youtube.com/watch?v=H3bbzpztrq8, last accessed Dec. 22, 2022 (4 pages).
"Urestone Panels," available at https://urestonepanels.com/, last accessed Dec. 22, 2022 (10 pages).

* cited by examiner

PANELS AND METHODS OF PREPARATION THEREOF

CROSS-REFERENCE TO RELATED APPLICATIONS

This application is the national stage entry of PCT/US2021/034923, filed on May 28, 2021, which claims priority to U.S. Provisional Application No. 63/057,024, filed on Jul. 27, 2020, which is incorporated herein by reference in its entirety.

TECHNICAL FIELD

The present disclosure generally relates to composite design panels, and methods of use and preparation thereof.

BACKGROUND

Exterior siding materials often include heavy and bulky materials such as stone, masonry, concrete, and brick. These materials are configured into panels with a decorative appearance. While these panels can provide the look of natural materials, their weight presents obstacles to forming panels of the desired size and shape, including large panels.

SUMMARY

The present disclosure includes panels comprising design elements and related methods of preparation and use thereof. For example, the present disclosure includes a panel configured for attachment to a mounting surface, the panel comprising a foam composite comprising a polymer and an inorganic filler, wherein the foam composite has a front surface opposite a back surface; and a layer of a facing material covering at least the front surface of the foam composite, the facing material including at least one design element. The foam composite may have a density less than or equal to 20 pcf, for example, and/or the layer of facing material may have a thickness of 1/16 inch to 1 inch, wherein the facing material According to some examples herein, a back side of the panel opposite the front surface, the back side being configured for attachment to the mounting surface, does not include the facing material. Additionally or alternatively, the back surface may include at least one channel, e.g., a plurality of channels, defining a flow path configured to direct flow of a fluid between the panel and the mounting surface, such that fluid entering the flow path from a top edge of the panel flows in a direction towards a side edge of the panel.

The facing material may be inorganic. For example, the facing material may comprise cementitious material, optionally having a density of 80 pcf to 130 pcf. In at least one example, the design element may provide an appearance of brick, stone, wood, or tile. The panel may have a length in a direction from a first side edge to a second side edge of the panel of greater than 1 foot or greater than 3 feet.

The inorganic filler of the foam composite may comprise, for example, fly ash, bottom ash, glass microspheres, cenospheres, calcium carbonate, or a mixture thereof. Additionally or alternatively, the polymer of the foam composite may comprise polyurethane, polyvinylchloride, polypropylene, polyethylene, polyethylene terephthalate, polyamide, polystyrene, acrylonitrile butadiene styrene, polycarbonate, polyethylenimine, or a combination thereof. The foam composite optionally may comprise organic fibers, inorganic fibers, or both.

The present disclosure also includes a panel configured for attachment to a mounting surface, the panel comprising a foam composite comprising a polymer and an inorganic filler; and a layer of a facing material having a thickness of 1/16 inch to 1 inch covering at least the front surface of the foam composite, wherein the facing material comprises a cementitious material in direct contact with the foam composite. The facing material may include at least one design element providing an appearance of brick, stone, wood, or tile, for example. The back side of the panel, e.g., the back side of the foam composite, may include attachment features, such as a fastener and/or a bracket. Additionally, or alternatively, the back side of the panel, e.g., the back surface of the foam composite, may include at least one channel that defines a flow path configured to direct flow of a fluid between the panel and the mounting surface, such that the fluid entering the flow path from a top edge of the panel flows in a direction towards a side edge of the panel. In at least one example, the foam composite has a density less than or equal to 20 pcf, and the facing material has a density of 80 pcf to 130 pcf. The panel may have a length in a direction from a first side edge to a second side edge of the panel of greater than 1 foot or greater than 3 feet, wherein the first side edge may have features complementary to features of a second side edge of an adjacent panel.

The present disclosure also includes a method of making panels, including the panels described above and elsewhere herein, the method comprising applying a layer of a facing material to a surface of a mold; and applying a polymer mixture to the layer of facing material, wherein the polymer mixture forms a foam composite inside the mold; wherein the facing material includes at least one design element. The layer of facing material may have a thickness of 1/16 inch to 1 inch and/or the foam composite may have a density less than or equal to 20 pcf. The method may optionally comprise adding a pigment or dye to the mold before, during, or after applying the layer of facing material. The facing material optionally may comprise a cementitious material and/or one or more other inorganic materials. In at least some examples herein, the back surface of the panel (opposite the front surface that includes the design element) does not include the facing material.

The present disclosure also includes a method of making panels, including the panels described above and elsewhere herein, the method comprising adhering the panel to the mounting surface. In some examples, adhering comprises sticking the panel to the mounting surface with an adhesive or a magnet. In at least some examples, the method is devoid of mechanically fastening the panel to the mounting surface; the method comprises partitioning the panel; partitioning is devoid of machining the panel; partitioning is devoid of the use of a rotating or reciprocating tool; and/or partitioning comprises scoring and snapping the panel.

BRIEF DESCRIPTION OF THE DRAWINGS

The accompanying drawings, which are incorporated in and constitute a part of this application, illustrate certain exemplary features of the present disclosure, and together with the description, serve to explain the principles of the present disclosure. Elements depicted in the figures are not necessarily drawn to scale. The dimensions of some features may be exaggerated relative to other features to improve understanding of exemplary embodiments. Those of ordinary skill in the art will readily recognize that the features of a particular aspect or embodiment may be used in conjunction with the features of any or all of the other aspects or embodiments described in this disclosure.

FIGS. 1A-1C illustrate an exemplary panel, in accordance with some aspects of the present disclosure, wherein FIG. 1A shows a cross-sectional view, FIG. 1B shows another cross-sectional view with attachment features, and FIG. 1C shows the back surface of the panel.

DETAILED DESCRIPTION

Figure 1A:
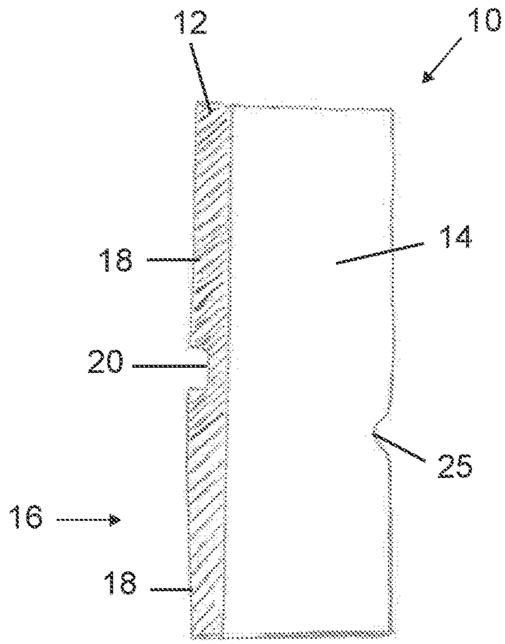

The singular forms "a," "an," and "the" include plural reference unless the context dictates otherwise. The terms "approximately" and "about" refer to being nearly the same as a referenced number or value. As used herein, the terms "approximately" and "about" generally should be understood to encompass ±5% of a specified amount or value. All ranges are understood to include endpoints, e.g., a molecular weight between 250 g/mol and 1000 g/mol includes 250 g/mol, 1000 g/mol, and all values between.

The present disclosure generally includes building materials such as panels, e.g., composite design panels. For example, the composite design panels may be configured for attachment to a mounting surface. The composite panels herein may include at least one design element resembling desired materials such as brick, stone, wood, tile, or the like. As such, the composite panels herein may be formed to emulate such building materials.

The composite panels herein may comprise a facing material providing the design element(s). For example, the composite panel may comprise one or more layers of facing material covering a surface of the composite panel. The facing material also may promote durability and strength of the panels. The layer(s) of facing material may provide the aesthetics, feel, and/or durability of desired building materials such as stone or brick, without the corresponding weight of those materials.

The facing material of the panels may include any suitable material useful for simulating various building materials. The facing material may be an inorganic facing material. Exemplary facing materials suitable for the composite panels herein include but are not limited to, cementitious materials, polymeric cement, fiber mesh, fillers, composite materials, mixtures thereof, and combinations thereof. In some examples, the facing material may include a cementitious material. Exemplary cements include Portland cement, rapid-hardening cement, calcium aluminate cement, calcium sulfoaluminate cement, slag, calcium sulfate, other specialty type cement, a blend of cements, a blend of pozzolans, and combinations thereof.

The cement may comprise, for example, Portland cement, calcium sulfoaluminate cement, or combinations thereof. Exemplary Portland cements include, for example, Type I ordinary Portland cement (OPC), Type II OPC, Type III OPC, Type IV OPC, Type V OPC, low alkali Type I OPC, low alkali Type II OPC, low alkali Type III OPC, low alkali Type IV OPC, low alkali Type V OPC, and combinations thereof. In at least one example, the cement comprises a blend of Type I OPC and calcium sulfoaluminate cement, which may be present in the one or more layers of facing material in a ratio of Type I OPC to calcium sulfoaluminate cement of from 1:6 to 6:1.

The one or more layers of facing material may have a total thickness less than or equal to 2 inches, for example, less than or equal to 1 inch. In some examples, the facing material may have a thickness from about 1/24 inch to about 2 inches, from about 1/18 inch to about 1.5 inches, or from about 1/16 inch to about 1 inch. In other examples, the facing material may have a thickness of at least 1/16 inch, at least 1/4 inch, or at least 1/2 inch. In contrast to polymeric panels devoid of facing material, the panels of the present disclosure can provide a more realistic look and feel resembling stone, brick, etc. polymeric panels. For example, when one knocks on a stone or brick wall, a different sound is produced compared to other lightweight building materials, e.g., drywall, which produces more hollow, sound echoes in the cavities of the material. In some cases, a minimum thickness of facing material may be used to more closely resemble one or more properties of the other types of building materials such as stone and brick. For example, the facing material may have a minimum thickness of 1/18 inch or 1/16 inch.

The facing material of the composite panels according to the present disclosure may produce the sound and feel more indicative of a denser building material during a "knock test," allowing the composite panels to resemble heavier building materials, e.g., brick and stone. Thickness of the facing material may improve durability, e.g., to inhibit or prevent damage to the composite panel. If the facing material is too thin or has too low a density, it may render the composite panel prone to damage, such that the panel could easily be penetrated and/or destroyed. For example, a thin facing material may have low impact resistance to withstand contact from atmospheric elements, such as weather-related effects, e.g. rain, snow, or hail. At the same time, the thickness may be selected so that the composite panel is lightweight and has a low density. The thickness of the facing material may be selected depending on the desired weight and density of the composite panel.

The facing material may have an average density of about 80 $lb/ft^3$ (pcf) to about 130 pcf, such as about 90 pcf to about 125 pcf, or about 95 pcf to about 120 pcf (1 pcf=16.0 $kg/m^3$). According to some aspects of the present disclosure, the density of the facing material is greater than the density of the polymer composite, as discussed below. The facing material may be more dense and/or more rigid than the polymer composite, such that the facing material resembles heavier building materials by producing a more solid sound, as discussed above.

The composite panels herein may comprise a polymer composite, e.g., a filled polymer composite. The polymer of the composites herein may be in the form of a foam. The polymer of the panels may comprise a thermosetting polymer. For example, the polymer may comprise an epoxy resin, phenolic resin, bismaleimide, polyimide, polyolefin, polyurethane, polyvinylchloride, polypropylene, polyethylene, polyethylene terephthalate, polyamide, polystyrene, acrylonitrile butadiene styrene, polycarbonate, polyethylenimine, or a combination thereof.

For example, the polymer composite may comprise polyurethane, e.g., prepared by foaming a mixture comprising a isocyanate and at least one polyol. Isocyanates suitable for use in preparing the composites herein may include at least one monomeric or oligomeric poly- or di-isocyanate. Exemplary diisocyanates include, but are not limited to, methylene diphenyl diisocyanate (MDI), including MDI monomers, oligomers, and combinations thereof. Factors that may influence the choice of a particular isocyanate can include the overall properties of the foam composite, such as the amount of foaming, strength of bonding to a functional filler, wetting of inorganic fillers in the mixture, strength of the resulting composite, stiffness (elastic modulus), and reactivity.

The polymer may comprise at least one polyol. For example, liquid polyols having relatively low viscosities generally facilitate mixing. Suitable polyols include those having viscosities of 10000 cP or less at 25° C., such as a viscosity of 150 cP to 10000 cP, 200 cP to 8000 cP, 5000 cP to 10,000 cP, 5000 cP to 8000 cP, 2000 to 6000 cP, 250 cP to 500 cP, 500 cP to 4000 cP, 750 cP to 3500 cP, 1000 cP to 3000 cP, or 1500 cP to 2500 cP at 25° C. Further, for example, the polyol(s) may have a viscosity of 8000 cP or less, 6000 cP or less, 5000 cP or less, 4000 cP or less, 3000 cP or less, 2000 cP or less, 1000 cP or less, or 500 cP or less at 25° C.

The polyols useful for the composite herein may include compounds of different reactivity, e.g., having different numbers of primary and/or secondary hydroxyl groups. In some embodiments, the polyols may be capped with an alkylene oxide group, such as ethylene oxide, propylene oxide, butylene oxide, and combinations thereof, to provide the polyols with the desired reactivity. In some examples, the polyols can include a poly(propylene oxide) polyol including terminal secondary hydroxyl groups, the compounds being end-capped with ethylene oxide to provide primary hydroxyl groups.

The polyol(s) useful for the present disclosure may have a desired functionality. For example, the functionality of the polyol(s) may be 7.0 or less, e.g., 1.0 to 7.0, or 2.5 to 5.5. In some examples, the functionality of the polyol(s) may be 6.5 or less, 6.0 or less, 5.5 or less, 5.0 or less, 4.5 or less, 4.0 or less, 3.5 or less, 3.0 or less, 2.5 or less, and/or 1.0 or greater, 2.0 or greater, 2.5 or greater, 3.0 or greater, 3.5 or greater, or 4.0 or greater, or 4.5 or greater, or 5.0 or greater. The average functionality of the polyols useful for the composites herein may be 1.5 to 5.5, 2.5 to 5.5, 3.0 to 5.5, 3.0 to 5.0, 2.0 to 3.0, 3.0 to 4.5, 2.5 to 4.0, 2.5 to 3.5, or 3.0 to 4.0.

The polyol(s) useful for the composite herein may have an average molecular weight of 250 g/mol or greater and/or 1500 g/mol or less. For example, the polyol(s) may have an average molecular weight of 300 g/mol or greater, 400 g/mol or greater, 500 g/mol or greater, 600 g/mol or greater, 700 g/mol or greater, 800 g/mol or greater, 900 g/mol or greater, 1000 g/mol or greater, 1100 g/mol or greater, 1200 g/mol or greater, 1300 g/mol or greater, or 1400 g/mol or greater, and/or 1500 g/mol or less, 1400 g/mol or less, 1300 g/mol or less, 1200 g/mol or less, 1100 g/mol or less, 1000 g/mol or less, 900 g/mol or less, 800 g/mol or less, 700 g/mol or less, 600 g/mol or less, 500 g/mol or less, 400 g/mol or less, or 300 g/mol or less. In some cases, the one or more polyols have an average molecular weight of 250 g/mol to 1000 g/mol, 500 g/mol to 1000 g/mol, or 750 g/mol to 1250 g/mol.

Polyols useful for the composite herein include, but are not limited to, aromatic polyols, polyester polyols, poly ether polyols, Mannich polyols, and combinations thereof. Exemplary aromatic polyols include, for example, aromatic polyester polyols, aromatic polyether polyols, and combinations thereof. Exemplary polyester and poly ether polyols useful in the present disclosure include, but are not limited to, glycerin-based polyols and derivatives thereof, polypropylene-based polyols and derivatives thereof, and poly ether polyols such as ethylene oxide, propylene oxide, butylene oxide, and combinations thereof that are initiated by a sucrose and/or amine group. Mannich polyols are the condensation product of a substituted or unsubstituted phenol, an alkanolamine, and formaldehyde. Examples of Mannich polyols that may be used include, but are not limited to, ethylene and propylene oxide-capped Mannich polyols.

The mixture used to prepare the composite optionally may comprise one or more additional isocyanate-reactive monomers. When present, the additional isocyanate-reactive monomer(s) can be present in an amount of 30% or less, 25% or less, 20% or less, 15% or less, 10% or less, or 5% or less by weight, based on the weight of the one or more polyols. Exemplary isocyanate-reactive monomers include, for example, polyamines corresponding to the polyols described herein (e.g., a polyester polyol or a poly ether polyol), wherein the terminal hydroxyl groups are converted to amino groups, for example by amination or by reacting the hydroxyl groups with a diisocyanate and subsequently hydrolyzing the terminal isocyanate group to an amino group. For example, the polymer mixture may comprise a poly ether polyamine, such as polyoxyalkylene diamine or polyoxyalkylene triamine.

In some embodiments, the mixture may comprise an alkoxylated polyamine (e.g., alkylene oxide-capped polyamines) derived from a polyamine and an alkylene oxide. Alkoxylated polyamines may be formed by reacting a suitable polyamine (e.g., monomeric, oligomeric, or polymeric polyamines) with a desired amount of an alkylene oxide. The polyamine may have a molecular weight less than 1000 g/mol, such as less than 800 g/mol, less than 750 g/mol, less than 500 g/mol, less than 250 g/mol, or less than 200 g/mol. In some embodiments, the ratio of number of isocyanate groups to the total number of isocyanate reactive groups (e.g., hydroxyl groups, amine groups, and water) in the mixture is 0.5:1 to 1.5:1, which when multiplied by 100 produces an isocyanate index of 50 to 150. In some embodiments, the mixture may have an isocyanate index equal to or less than 140, equal to or less than 130, or equal to or less than 120. For example, with respect to a mixture used to prepare some polymers herein, the isocyanate index may be 80 to 140, 90 to 130, or 100 to 120. Further, for example, with respect to polyisocyanurate foams, the isocyanate index may be 180 to 380, such as 180 to 350 or 200 to 350.

In some embodiments, the isocyanate and the polyol(s) are present in the polymer in a weight ratio (isocyanate: polyol) less than 1:5. For example, the weight ratio may be less than 1:7 or less than 1:10, e.g., a weight ratio of 1:6 to 1:20 or 1:10 to 1:15.

The composite herein may be prepared with a catalyst, e.g., to facilitate curing and control curing times. Examples of suitable catalysts include, but are not limited to catalysts that comprise amine groups (including, e.g., tertiary amines such as 1,4-diazabicyclo[2.2.2]octane (DABCO), tetramethylbutanediamine, and diethanolamine) and catalysts that contain tin, mercury, or bismuth. The amount of catalyst in the mixture may be 0.01% to 2% based on the weight of the mixture used to prepare the polymer of the composite (e.g., the mixture comprising the isocyanate(s), the polyol(s), and other materials such as foaming agents, surfactants, chain-extenders, crosslinkers, coupling agents, UV stabilizers, fire retardants, antimicrobials, anti-oxidants, cell openers, and/or pigments). For example, the amount of catalyst may be 0.05% to 0.5% by weight, or 0.1% to 0.25% by weight, based on the weight of the mixture used to prepare the polymer. In some embodiments, the mixture may comprise between 0.05 and 0.5 parts per hundred parts of polyol.

In some embodiments of the present disclosure, the amount of polymer may be present in the composite in an amount of 10% to 65% by weight, such as 25% to 55%, 15% to 50%, or 20% to 50% by weight, based on the total weight of the composite. In some examples, the polymer comprises, consists essentially of, or consists of polyurethane. In some examples, the polymer comprises polyurethane and polyurea, e.g., more than 50%, 60%, 70%, 80%, 90%, 95%, or 98% by weight polyurethane and less than 50%, 40%, 30%, 20%, 10%, 5%, or 2% polyurea.

The composite herein may comprise a filler material, such as an inorganic filler, e.g., inorganic particles. In some examples, the filler comprises calcium, silicon, aluminum, magnesium, carbon, or a mixture thereof. Exemplary fillers useful for the composites herein include, but are not limited to, fly ash, bottom ash, amorphous carbon (e.g., carbon black), silica (e.g., silica sand, silica fume, quartz), glass (e.g., ground/recycled glass such as window or bottle glass, milled glass, glass spheres and microspheres, glass flakes), calcium, calcium carbonate, calcium oxide, calcium hydroxide, aluminum, aluminum trihydrate, clay (e.g., kaolin, red mud clay, bentonite), mica, talc, wollastonite, alumina, feldspar, gypsum (calcium sulfate dehydrate), garnet, saponite, beidellite, granite, slag, antimony trioxide, barium sulfate, magnesium, magnesium oxide, magnesium hydroxide, aluminum hydroxide, gibbsite, titanium dioxide, zinc carbonate, zinc oxide, molecular sieves, perlite (including expanded perlite), diatomite, vermiculite, pyrophillite, expanded shale, volcanic tuff, pumice, hollow ceramic spheres, cenospheres, and mixtures thereof. According to some aspects of the present disclosure, for example, the filler comprises two or more different inorganic materials, such as a carbonate (e.g., calcium carbonate) and fly ash.

In some embodiments, the filler may comprise an ash produced by firing fuels including coal, industrial gases, petroleum coke, petroleum products, municipal solid waste, paper sludge, wood, sawdust, refuse derived fuels, switchgrass, or other biomass material. For example, the filler may comprise a coal ash, such as fly ash, bottom ash, or combinations thereof. Fly ash is generally produced from the combustion of pulverized coal in electrical power generating plants. In some examples herein, the composite comprises fly ash selected from Class C fly ash, Class F fly ash, or a mixture thereof. In some embodiments, the filler consists of or consists essentially of fly ash.

The filler may have an average particle size greater than or equal to 0.1 μm and/or less than or equal to 1000 μm. For example, at least a portion of the filler may have an average particle size of 100 μm to 700 μm, 200 μm to 600 μm, or 300 μm to 500 μm. Further, for example, the filler may have an average particle size of 0.1 μm to 100 μm, such as 1 μm to 30 μm, 20 μm to 50 μm, or 40 μm to 70 μm. In some embodiments, the filler has an average particle size diameter of 100 μm or more, 150 μm or more, 500 μm or more, or 700 μm or more, e.g., between 100 μm and 450 μm or between 500 μm and 800 μm. In some embodiments, the filler has an average particle size of 500 μm or less, 400 μm or less, or 350 μm or less, e.g., between 50 μm and 450 μm or between 200 μm and 350 μm.

The filler can be present in the composite in an amount of greater than or equal to 30% by weight, based on the total weight of the composite, such as greater than or equal to 35% by weight, greater than or equal to 40% by weight, greater than or equal to 45% by weight, greater than or equal to 50% by weight, greater than or equal to 55% by weight, or greater than or equal to 65% by weight. For example, the amount of filler in the composite may be 30% to 70% by weight or 40% to 60% by weight, e.g., about 45%, about 55%, or about 60%, by weight.

In some examples, at least 15% by weight, at least 30% by weight, or at least 50% by weight of the filler may be present as particles having an average particle size of 0.1 μm to 800 μm, based on the total weight of the filler. For example, about 15%, about 20%, about 25%, about 30%, about 35%, about 40%, about 45%, about 50%, about 55%, or about 60%, by weight of the filler may be present as particles having an average particle size of 10 μm to 800 μm.

As described herein, the polymer composite, e.g., foam composite, of the composite panels herein have a low or relatively low density. For example, the foam composite may have an average density of about 2 lb/ft$^3$ (pcf) to about 20 pcf, such as about 2 pcf to about 18 pcf, about 2 pcf to about 16 pcf, about 2 pcf to about 14 pcf, about 4 pcf to about 20 pcf, about 4 pcf to about 18 pcf, about 4 pcf to about 16 pcf, or about 4 pcf to about 14 pcf (1 pcf=16.0 kg/m$^3$). In some examples, the panel may comprise a foam composite having a density less than or equal to about 20 pcf, less than or equal to about 18 pcf, less than or equal to about 16 pcf, less than or equal to about 14 pcf, or less than or equal to about 12 pcf.

The composite panels herein (including foam composite and facing material) may have an average density of about 10 pcf to about 30 pcf, such as about 12 pcf to about 25 pcf, or about 15 pcf to about 22 pcf. The density of the composite panels may depend on the thickness of the facing material.

The polymer composite (e.g., foam composite) may have a thickness less than or equal to 3 inches, less than or equal to 2 inches, or less than or equal to 1 inch. For example, the polymer composite may have a thickness of at least 1/16 inch (e.g., from 1/16 inch to 3 inches), at least 1/12 inch, at least 1/8 inch, at least 1/4 inch, at least 1/2 inch, or at least 1 inch. The thickness of the polymer composite may be altered depending on the desired density and/or weight of the composite panel.

In some examples, the polymer composite, e.g., foam composite, may comprise one or more organic materials and/or one or more inorganic or organic fiber materials. The fiber materials can be any natural or synthetic fiber, based on inorganic or organic materials. Exemplary fiber materials include, but are not limited to, glass fibers, silica fibers, carbon fibers, metal fibers, mineral fibers, organic polymer fibers, cellulose fibers, biomass fibers, and combinations thereof.

The foam composites herein may comprise at least one additional material, such as, e.g., foaming agents, surfactants, chain-extenders, crosslinkers, coupling agents, UV stabilizers, fire retardants, antimicrobials, anti-oxidants, cell openers, and/or pigments. Exemplary surfactants include, but are not limited to, silicone surfactants.

The composite panels herein may be used for any desirable type of building product, such as siding. For example, the composite panels herein may be configured for attachment to a mounting surface, such that the composite panels may be applied to exterior structures. The composite panels may be durable, e.g., aided by facing material(s), and/or light weight, e.g., in view of incorporating a relatively low density foam composite.

The facing material may cover one or more surface of the foam composite, e.g., covering a front surface, a back surface opposite the front surface, and/or one or more side surfaces. For example, facing material may cover at least the front surface of the foam composite. As mentioned above, the facing material may include at least one design element configured to resemble various building materials, for example, brick, stone, wood, tile, or the like. In some examples, the front side of the composite panel may comprise, consist of, or consist essentially of the facing material, which provides the design element(s). Optionally, the back surface of the composite panel also may include a facing material. In some examples herein, the back surface does not include facing material. That is, the back surface of the composite panel is defined by a polymer composite without a facing material or other coating. As discussed below, the back surface and/or other surfaces of the composite panel may include features to facilitate ventilation between the panel and a mounting surface.

The back surface of the panel may be configured for attachment to a mounting surface. For example, the back surface may include or be coupled to attachment elements, e.g., one or more brackets and/or fasteners. Exemplary fasteners include, but are not limited to, nails, screws, and staples. If attachment elements are present, they may be located on the back surface of the panel such that the weight of the panel is supported and the panel may be cut down to adjust the length of the panel.

Figure 1B:
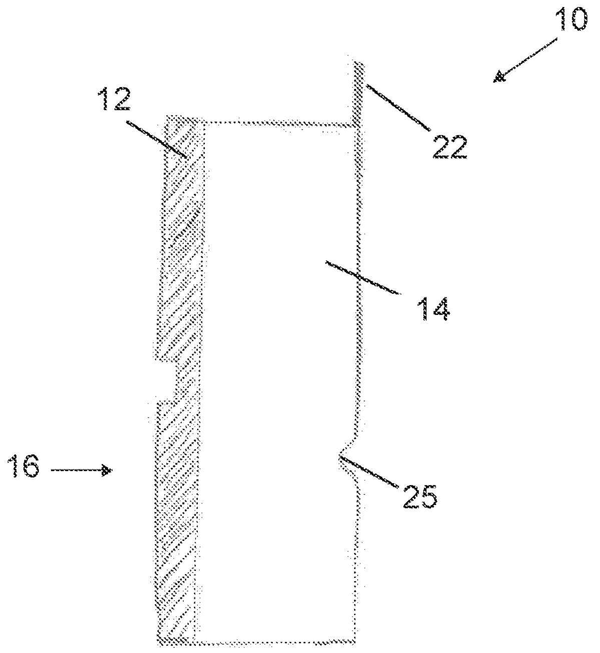
Figure 1C:
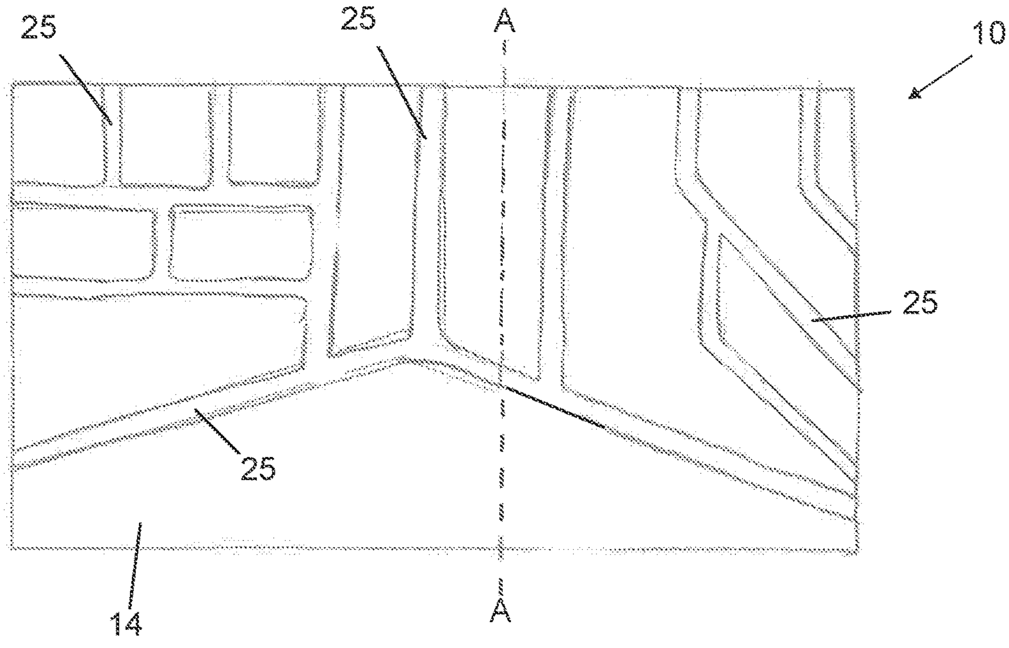

FIGS. 1A-1C illustrate features of an exemplary panel 10 comprising a foam composite 14 and a facing material 12, e.g., provided as a layer on the front surface of the foam composite 14. As shown in cross-sectional view in FIG. 1A (line A-A in FIG. 1C), the panel 10 does not include facing material 12 on the back surface of the panel 10. The facing material 12 includes a design element 16, providing the appearance of brick 18 and mortar 20. FIG. 1B shows the same cross-sectional view of the panel 10, wherein the back surface includes an attachment feature 22, such as a bracket, for mounting the panel to a wall or other mounting surface. The panel 10 as shown also includes drainage features in the form of one or more channels 25, e.g., formed within the foam composite 14. FIG. 1C illustrates a plurality of channels 25 that form a flow path for directing fluid, such as water or other liquid, towards the sides of the panel. Thus, the drainage features avoid or minimize trapping of water or other fluid between the panel 10 and the mounting surface. Two or more channels 25 optionally may be in communication, e.g., providing for a system of interconnected channels 25.

The panels herein may be prepared with any desired dimensions or shapes, e.g., having a plurality of edges. According to some aspects of the present disclosure, the panels may be prepared as a flat sheet (in rectangular shape having a length, a width, and a thickness). For example, the panel may include a first side edge, a second side edge, a top edge, and a bottom edge, such that the first side edge and the second side edge are on opposing sides of the panel along the x-axis, and the top edge and the bottom edge are on opposing sides of the panel along the y-axis. The panel may be configured to attach to an adjacent panel to form long siding panels. For example, the first side edge may have features complementary to features of a second side edge of the adjacent panel such that the first side edge may attach to a second side edge of the adjacent panel.

The panel may have a length (measured along the x-axis) in a direction from the first side edge to the second side edge greater than about 1 foot, greater than about 2 feet, greater than about 3 feet, greater than about 4 feet, greater than about 5 feet, greater than about 6 feet, greater than about 7 feet, or greater than about 8 feet. For example, the length of the panel may range from about 2 feet to about 20 feet, from about 4 feet to about 18 feet, or from about 6 feet to about 16 feet.

The panel may have a width (measured along the y-axis) in a direction from the top edge of the panel to the bottom edge of the panel greater than about 0.5 feet, greater than about 1 foot, greater than about 2 feet, greater than about 3 feet, greater than about 4 feet, greater than about 5 feet, greater than about 6 feet, greater than about 7 feet, or greater than about 8 feet. For example, the width of the panel may range from about 2 feet to about 20 feet, from about 4 feet to about 18 feet, or from about 6 feet to about 16 feet.

The panel may have a width-to-length ratio less than or equal to about 1.5, less than or equal to about 1, or less than or equal to about 0.5. For example, the panel may be 4 feet wide by 8 feet long, 8 feet wide by 16 feet long, 10 feet wide by 12 feet long, or 12 feet wide by 10 feet long.

The panel may have a thickness (measured along the z-axis) in a direction from the front surface of the panel to the back surface of the panel ranging from about 1/16 inch to 3 inches, from about 1/8 inch to 2.5 inches, from about 1/4 inch to 2 inches, or from about 0.5 inch to 1.5 inches.

The composite panel may weigh less than panels of similar dimensions comprising brick, wood, stone, tile, or the like. Panels as discussed herein having dimensions greater than or equal to 6 inch in width, 6 feet in length, and 1 inch in thickness may weigh less than or equal to 40 pounds. For example, the panels may weigh less than or equal to 35 pounds, less than or equal to 30 pounds, less than or equal to 25 pounds, less than or equal to 20 pounds, less than or equal to 15 pounds, less than or equal to 10 pounds, or less than or equal to 5 pounds. The composite panels discussed herein are configured to resemble heavier and bulkier building materials such as brick and stone (e.g., the panels comprising a design element as discussed herein), while being lightweight and low density as compared to other building materials. Low density materials, such as a low density foam composite, allows for the manufacture of panels that are larger than the above-mentioned building materials without a corresponding increase in weight. For example, brick or stone panels of varying lengths, e.g., greater than about 1 foot or greater than about 3 feet as detailed above, are more difficult to move and install, compared to the composite panels described herein.

The composite panels herein may be used as siding material, wherein the panels may be attached to the mounting surface such that the bottom edge of a panel may be adjacent to a top edge of a second panel. When used on the exterior of a building, e.g., as siding, the panels may be exposed to various environmental conditions, e.g., water and other liquids, air, aerosols, etc. The composite panels herein may include features to promote ventilation to avoid or minimize wear and tear on the composite panel and/or mounting surface. For example, one or more surfaces may include at least one channel or a combination of channels. The channel or combination of channels may define a flow path to allow for the passage of fluid, e.g., air and/or liquid, between the back surface of the composite panel and the mounting surface when the composite panel is attached to the mounting surface. In some examples, the flow path may be configured to direct a fluid towards a side edge of the panel, to lessen and/or eliminate the amount of water, moisture, and/or air flow from flowing downwards to the other panels.

The composite panels described herein may be prepared by any suitable process, including, for example, a molding process. For example, during manufacturing, one or more layers of a facing material (e.g., inorganic facing material) may be applied to a mold. Optionally, a pigment or dye may be added before, at the same time, or after applying the facing material, wherein the pigment or dye may form part of the design element of the composite panel. For example, the mold may be painted or coated with a pigment or dye after applying the facing material, such that once the layer(s) of facing material dries, it will uptake the pigment or dye to produce the design element. A polymer mixture may then be added to the mold, such that the polymer mixture directly contacts the facing material. A polymeric foam composite may be prepared using chemical blowing agents, physical blowing agents, or a combination thereof. For example, the polymer mixture may form a foam composite by free rise foaming.

The mold may be an open mold or closed mold. For example, a closed mold may include ridges and/or protrusions (e.g., on a surface of the mold opposite the applied facing material) to form channels on a surface of the foam composite.

In an exemplary procedure, one or more polyols, an isocyanate, and a filler (together with other components such as additional isocyanate-reactive monomers, blowing agents, surfactants, fire retardants, or other additives) are combined to form a polymer mixture. The isocyanate may be added together with the other components before mixing, or in some examples, the isocyanate is added after the other components have been mixed together. That is, the components can be combined in any suitable order. For example, in some embodiments, the mixing stage of the method used to prepare the polymer mixture can include: (1) mixing the polyol(s) and filler; (2) mixing the isocyanate with the polyol(s) and filler, and optionally (3) mixing a catalyst with the isocyanate, the polyol(s), and the filler.

The composite panels herein may combine low density with desired flexural strength, such that the composite panel may be suitable for use in building products. For example, the composite panels herein may have flexural strength and/or other mechanical properties comparable to materials such as plywood, particle board, and other wood- or fiber-based materials.

The foam composite and/or composite panels herein may have a compressive strength greater than or equal to 20 psi (145.0 psi=1 MPa), greater than or equal to 40 psi, or greater than or equal to 60 psi, e.g., 20 psi to 500 psi, 30 psi to 400 psi, 40 psi to 450 psi, 50 psi to 100 psi, 300 to 400 psi, 100 to 250 psi, or 60 psi to 90 psi. Compressive strength can be measured by the stress measured at the point of permanent yield, zero slope, or significant change of the stress variation with strain on the stress-strain curve as measured according to ASTM D1621.

Additionally or alternatively, the foam composite and/or composite panel may have a flexural strength greater than or equal to 5 psi, greater than or equal to 10 psi, greater than or equal to 50 psi, greater than or equal to 100 psi, greater than or equal to 200 psi, greater than or equal to 300 psi, greater than or equal to 400 psi, and/or less than or equal to 500 psi, less than or equal to 400 psi, less than or equal to 300 psi, less than or equal to 200 psi, or less than or equal to 100 psi. Flexural strength can be measured as the load required to fracture a rectangular prism loaded in the three point bend test as described in ASTM C1185-08 (2012), wherein flexural modulus is the slope of the stress/strain curve.

The composite panels herein may be used for any desirable type of building product. For example, the composite panels may be used in place of other materials such as stone, brick, wood, tile, etc. For example, the composite panels herein may be formed into large panels, so that fewer panels are needed to cover a mounting surface, e.g., an exterior wall. The panels disclosed herein allow for a greater range of width-to-length ratios, e.g., in view of the lower weight as compared to other building materials. Thus, the present disclosure allows for the preparation of longer panels, compared to materials such as stone, brick, wood, tile, etc., such that fewer panels are needed to cover a given area. Such panels can facilitate installation and promote durability, e.g., providing fewer junctions between adjacent panels that may be susceptible to wear and tear.

In other example, the composite panels herein may be formed into small panels, so that the composite panels can be easily shipped, applied to a mounting surface with little or no experience and/or tools, and/or adhered to a mounting surface (e.g., an interior wall). Thus, the present disclosure allows for a method of attaching the composite panel to a mounting surface by adhering the panel to the mounting surface. The adhering can be by sticking the panel to the mounting surface with adhesive or a magnet. For example, the adhesive can be on adhesive pads attached to the composite panel or directly applied to the composite panel. The method of attaching the composite panel to the mounting surface can be devoid of mechanically fastening the panel to the mounting surface. Such smaller panels (e.g., 3'×1'×6" or smaller) method can facilitate ease of securing, fastening, and/or installing the panels onto the mounting surface, ease of removal of the panel from the mounting surface after attachment and/or ease of handling and/or shipping (e.g., by mail or express delivery).

In another aspect, the present disclosure allows for a method of attaching the composite panel to a mounting surface by adhering the panel to the mounting surface of further comprises partitioning the panel and partitioning the panel. In one example, the partitioning can be devoid of machining the panel. For example, the partitioning can be devoid of the use of a rotating or reciprocating tool. The partitioning can include scoring and snapping the panel (e.g., using a utility knife and a carbide tip tile joint removal tool). Alternatively, the composite panel can be partitioned using carbide tipped tooling and/or high speed tooling (e.g., rotary tools such as chop saws, skill saws, etc, reciprocating tools such as jig saws, hand saws and reciprocating saws) to provide a high degree of precision in the partitioning of the composite panel. Such partitioning can be devoid of any cracking of the layer of facing material. Thus, the composite panels can be easily partitioned (e.g., cut). Such characteristics are unique as compared to other panels (e.g., manufactured stone veneer panels) which utilize cementitious materials for durability and has a thickness that provides relief and texture to the surface that is aesthetically pleasing.

Such ease of attachment and partitioning of the composite panels can decrease installation time as compared with traditional cementitious products. In one example, attachment and partitioning of the composite panels and can be performed at the mounting surface with woodworking tools rather than to concrete cutting tools utilizing diamond blades, etc.

While principles of the present disclosure are described herein with reference to illustrative aspects for particular applications, the disclosure is not limited thereto. Those having ordinary skill in the art and access to the teachings provided herein will recognize additional modifications, applications, aspects, and substitution of equivalents that all fall in the scope of the aspects described herein. Accordingly, the present disclosure is not to be considered as limited by the foregoing description.

What is claimed is:

1. A panel configured for attachment to a mounting surface, the panel comprising:

a foam composite comprising a polymer and an inorganic filler, wherein the foam composite has a front surface opposite a back surface and a density less than or equal to 20 pcf; and a layer of a facing material having a thickness of 1⁄16 inch to 1 inch covering at least the front surface of the foam composite, wherein the facing material includes at least one design element comprising a pigment or dye and has a density of 80 pcf to 130 pcf, and wherein the at least one design element provides an appearance of brick, wood, or tile;

wherein the back surface of the foam composite includes at least one channel that defines a flow path configured to direct flow of a fluid between the panel and the mounting surface, such that fluid entering the flow path from a top edge of the panel flows in a direction towards a side edge of the panel.

2. The panel of claim 1, wherein a back side of the panel configured for attachment to the mounting surface does not include the facing material.

3. The panel of claim 1, wherein the facing material is inorganic.

4. The panel of claim 1, wherein the facing material comprises a cementitious material.

5. The panel of claim 1, wherein the panel has a length in a direction from a first side edge to a second side edge of the panel of greater than 1 foot or greater than 3 feet.

6. The panel of claim 1, wherein the inorganic filler comprises fly ash, bottom ash, glass microspheres, cenospheres, calcium carbonate, or a mixture thereof.

7. The panel of claim 1, wherein the polymer of the foam composite comprises polyurethane, polyvinylchloride, polypropylene, polyethylene, polyethylene terephthalate, polyamide, polystyrene, acrylonitrile butadiene styrene, polycarbonate, polyethylenimine, or a combination thereof.

8. The panel of claim 1, wherein the foam composite further comprises organic fibers, inorganic fibers, or both.

9. A panel configured for attachment to a mounting surface, the panel comprising:

a foam composite comprising a polymer and an inorganic filler; and a layer of a facing material having a thickness of 1⁄16 inch to 1 inch covering at least a front surface of the foam composite, wherein the facing material comprises a cementitious material in direct contact with the foam composite, the facing material including at least one design element comprising a pigment or dye and providing an appearance of brick, wood, or tile;

wherein a back surface of the foam composite includes at least one channel that defines a flow path configured to direct flow of a fluid between the panel and the mounting surface, such that the fluid entering the flow path from a top edge of the panel flows in a direction towards a side edge of the panel; and wherein the foam composite has a density less than or equal to 20 pcf, and the facing material has a density of 80 pcf to 130 pcf.

10. The panel of claim 9, wherein a back side of the panel includes a fastener and/or a bracket.

11. The panel of claim 9, wherein the panel has a length in a direction from a first side edge to a second side edge of the panel of greater than 1 foot or greater than 3 feet, and wherein the first side edge has features complementary to features of a second side edge of an adjacent panel.

12. A method of making a panel, the method comprising:

applying a layer of a facing material to a surface of a mold, the layer having a thickness of 1⁄16 inch to 1 inch;

applying a pigment or dye to the layer of facing material; and applying a polymer mixture to the layer of facing material after applying the pigment or dye, wherein the polymer mixture forms a foam composite inside the mold;

wherein the foam composite has a front surface in contact with the layer of facing material opposite a back surface, the back surface of the foam composite including at least one channel that defines a flow path configured to direct flow of a fluid between the panel and a mounting surface, such that the fluid entering the flow path from a top edge of the panel flows in a direction towards a side edge of the panel;

wherein the facing material includes the pigment or dye to form at least one design element and has a density of 80 pcf to 130 pcf, the at least one design element having an appearance of brick, wood, or tile; and wherein the foam composite has a density less than or equal to 20 pcf.

13. The method of claim 12, wherein the facing material comprises a cementitious material.

14. The method of claim 12, wherein a back surface of the panel does not include the facing material, the back surface of the panel being opposite a front surface of the panel that includes the design element.

15. The panel of claim 9, wherein the polymer of the foam composite comprises polyurethane, polyvinylchloride, polypropylene, polyethylene, polyethylene terephthalate, polyamide, polystyrene, acrylonitrile butadiene styrene, polycarbonate, polyethylenimine, or a combination thereof.

16. The panel of claim 9, wherein the inorganic filler comprises fly ash, bottom ash, glass microspheres, cenospheres, calcium carbonate, or a mixture thereof.

* * * * *